United States Patent
Kalisz

(10) Patent No.: US 8,448,980 B1
(45) Date of Patent: May 28, 2013

(54) ACTIVE BOLSTER WITH UNSYMMETRIC PLEATED INFLATION

(75) Inventor: Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/460,869

(22) Filed: May 1, 2012

(51) Int. Cl.
*B60R 21/16* (2006.01)

(52) U.S. Cl.
USPC ............ 280/730.1; 280/743.1; 280/753

(58) Field of Classification Search
USPC .............................. 280/730.1, 753
See application file for complete search history.

(56) References Cited

U.S. PATENT DOCUMENTS

| | | | |
|---|---|---|---|
| 5,570,901 A | 11/1996 | Fyrainer | |
| 5,931,493 A | 8/1999 | Sutherland | |
| 6,213,497 B1 * | 4/2001 | Spencer et al. | 280/730.1 |
| 6,578,867 B2 * | 6/2003 | Khoudari et al. | 280/730.1 |
| 6,758,493 B2 * | 7/2004 | Conlee et al. | 280/753 |
| 6,916,042 B2 | 7/2005 | Fukawatase | |
| 7,481,457 B2 * | 1/2009 | Best et al. | 280/752 |
| 2001/0054811 A1 * | 12/2001 | Spencer et al. | 280/730.1 |
| 2011/0260432 A1 | 10/2011 | Matsushima | |
| 2011/0272926 A1 | 11/2011 | Roychoudhury | |
| 2011/0272929 A1 | 11/2011 | Fukawatase | |

FOREIGN PATENT DOCUMENTS

JP 2008120106 5/2008

* cited by examiner

*Primary Examiner* — Toan To
(74) *Attorney, Agent, or Firm* — Vichit Chea; MacMillan, Sobanski & Todd, LLC

(57) ABSTRACT

An active bolster for protecting an occupant during a crash event of a motor vehicle includes a back wall and a front wall forming an inflatable bladder. The back wall includes a stationary central mounting section and a pleated section with generally-circumferential pleats that unfold during bladder inflation. The pleats provide a transverse curve length that is radially variable with a greatest transverse curve length toward a first end of the wall and a smallest transverse curve length toward an opposite end of the wall so that expansion of the wall is biased toward the to first end.

7 Claims, 6 Drawing Sheets

ACTIVE BOLSTER WITH UNSYMMETRIC PLEATED INFLATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to a pleated expansion wall with pleats with an unfolded length that is uneven in order to bias the expansion in a desired direction.

An active bolster is a type of vehicle occupant protection device having a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Co-pending application publication US2011/0316300A1, filed Jun. 26, 2010, entitled "Active Knee Bolster for Automotive Vehicle," which is incorporated herein by reference in its entirety, discloses an active knee bolster integrated into a glove box door that is light weight and visually attractive. Active bolsters are also commonly integrated into door panels for side impact protection.

In a typical structure, an active bolster includes a bladder comprised of a front wall or panel that faces a vehicle occupant attached to a back wall or panel along a sealed periphery. One or both of the walls are deformable in order to provide an inflatable bladder. The walls are initially spaced apart while in their non-inflated condition. This allows ingress of the inflation gas in a manner that achieves an even inflation across the panel.

The front and back walls of a typical active bolster are comprised of molded thermoplastics such as polyethylene, polyolefin, or PVC. They can be blow molded or injection molded. The back wall commonly employs a pleated structure that unfolds in an accordion-like fashion during inflation to provide the increasing volume of the bladder for forming an impact cushion. So that the bolster follows an outward trajectory away from its rigid mounting structure and toward the passenger, the pleats may be placed circumferentially around the back bladder wall.

In known systems, circumferential pleats have resulted in an expansion trajectory that is perpendicular to the Class A surface in a generally symmetrical manner. This expansion profile has been desirable in most situations where the is potential passenger interaction is symmetrical across the face of the bolster. In some situations, however, the Class A surface may be skewed with respect to the impacting passenger. For example, an instrument panel or dashboard in front of a front passenger seat may be curved or sculpted so that a glove box door is closer to the passenger on the left side than on the right side. A symmetric expansion of an active bolster in the glove box door would result in an uneven impact of the passenger with the bolster.

SUMMARY OF THE INVENTION

In one aspect of the invention, an active bolster is provided for protecting a person in a passenger seating area in an automotive vehicle during a crash event. The bolster comprises an expandable back wall for mounting against a rigid structure of the vehicle. An expandable front wall overlies the back wall and forms an interior trim component of the vehicle. The front wall has a generally planar Class A surface facing the passenger seating area and a Class B surface facing the back wall. The front wall and back wall have outer peripheral edges sealed together to provide a bladder chamber therebetween. The unexpanded Class A surface is skewed with respect to the passenger seating area defining a close quadrant and a distant quadrant on opposite ends of the Class A surface. A gas source supplies an expansion gas to inflate the bladder chamber during the crash event.

The back wall has a substantially stationary central mounting section for attaching to the rigid structure and a pleated section between the central mounting section and the peripheral edge. The pleated section comprises a plurality of generally-circumferential pleats that unfold during inflation. The pleats provide a transverse curve length that is radially variable, wherein a smallest transverse curve length in the distant quadrant is greater than a largest transverse curve length in the close quadrant so that the expansion of the bladder chamber is biased toward the distant quadrant.

DETAILED DESCRIPTION OF PREFERRED EMBODIMENTS

Figure 1:
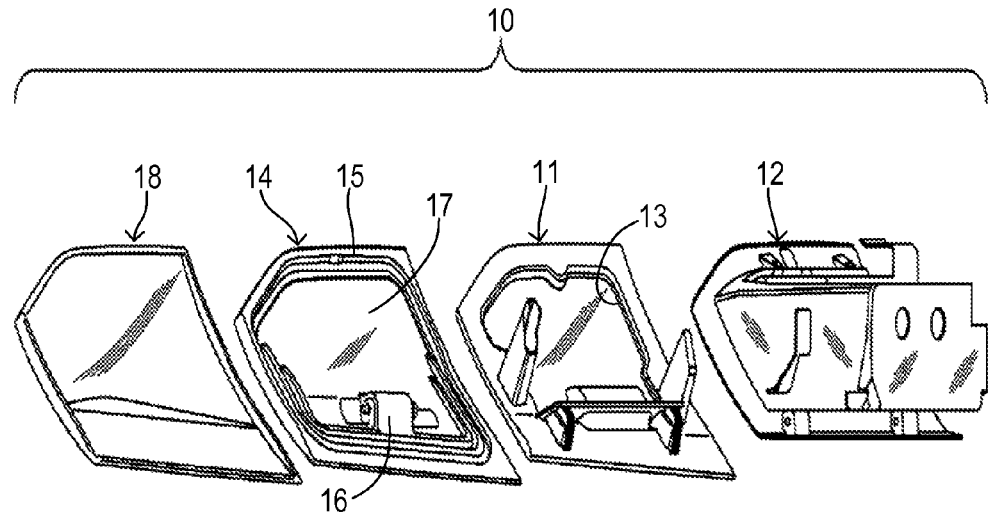
FIG. 1 is an outward-looking, exploded perspective view of an active knee bolster glove box door system of a type to which the present invention can be applied.

Referring now to FIG. 1, a prior art active knee bolster system 10 has a first wall or base panel 11 and a second wall or panel 14. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 has a periphery 13 adapted to be sealed to second wall 14 having a matching periphery 15. Walls 11 and 14 are preferably comprised of molded plastics and may be joined by plastic welding, such as hot plate welding or vibration welding, to form a peripheral seal around an interior open space 17 for forming a bladder. An inflation gas source 16 is electronically controlled for activating during a crash event to release gas to inflate the bolster. Wall 14 may comprise the interior trim surface (e.g., the outside of the glove box door), or an additional skin 18 can be applied to the outer surface (i.e., Class A surface) of front panel 14. Skin 18 is preferably constructed of plastic and may be a vacuum-formed thermoplastic bilaminate that may be grained or otherwise finished. Typically, wall 11 may be formed with a plurality of circumferential pleats (not shown) to increase the expanded size of the bladder. When additional skin or cover 18 is used, the pleats may also be located on wall 14.

Figure 2:
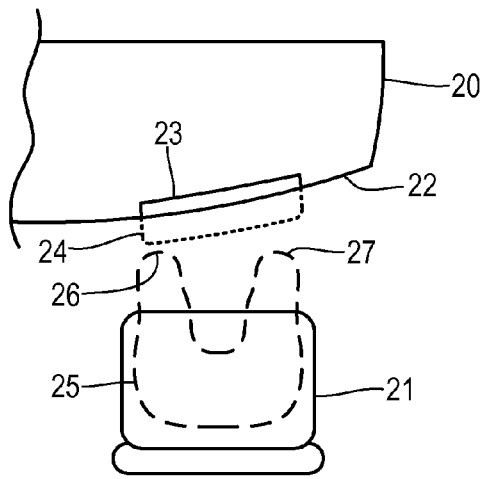
FIG. 2 is a top schematic view showing expansion of a bolster toward a passenger.

FIG. 2 shows an instrument panel 20 in front of a passenger seat 21. An outer passenger-facing or Class A surface 22 of instrument panel 20 is curved or sloped such that it is not parallel with the front of the passenger (as defined by a plane at the front of their knees and lower legs, for example). A bolster 23 contained on the front surface of instrument panel 20 such as in a glove box door deploys with a trajectory perpendicular to Class A surface 22 resulting in a symmetrical expanded shape 24. A passenger 25 seated in seat 21 with knees 26 and 27 would be unequally impacted by symmetrical shape 24.

Figure 3:
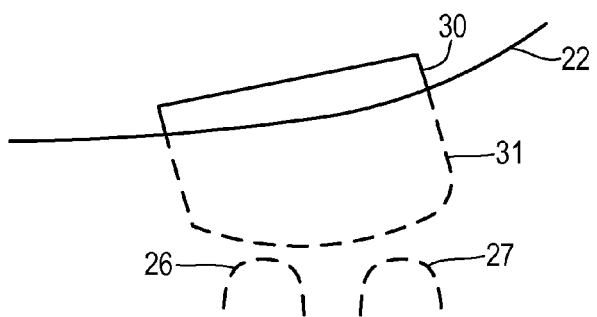
FIG. 3 is a top schematic view showing an uneven interaction between a symmetrically expanding bolster and a passenger in greater detail.

FIG. 3 shows an improved active bolster 30 contained on a skewed Class A surface 22. An asymmetrical expanded shape 31 is provided by the present invention for a more even interaction with knees 26 and 27 as described below.

Figure 4:
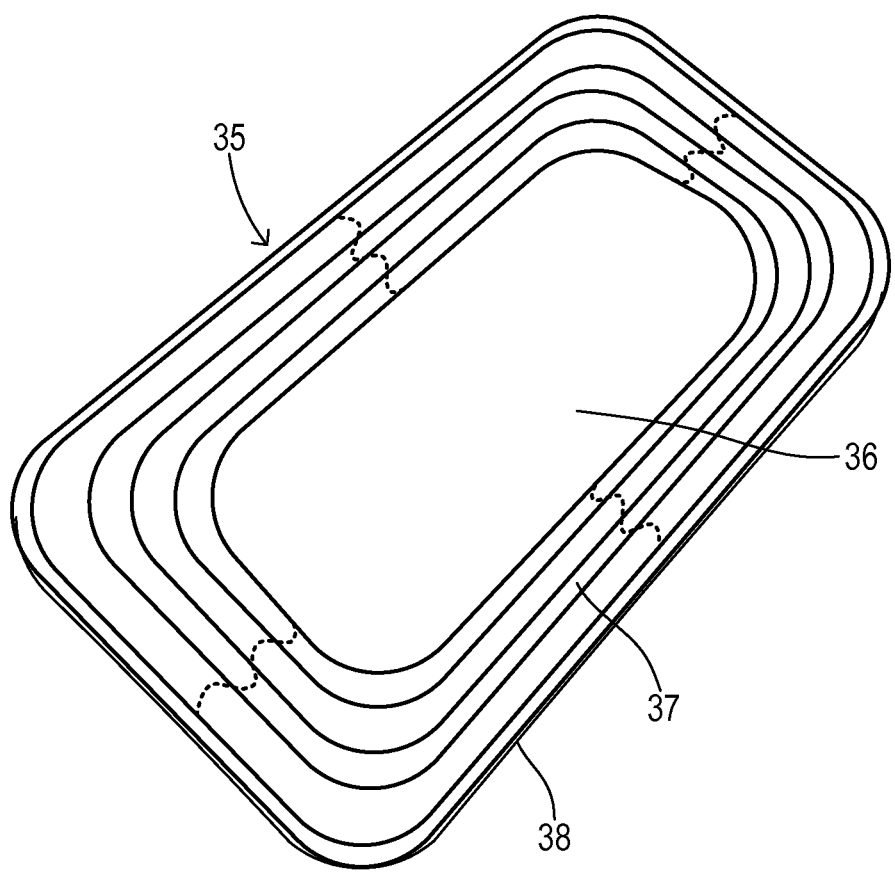
FIG. 4 is a perspective view of a prior art bladder back wall having continuous circumferential pleats.

The present invention uses a modification of the conventional circumferential pleats. Unmodified pleats are shown in FIG. 4. An expandable back wall 35 has a central mounting section 36 for attaching to rigid structure such as a glove box door, a dashboard frame, or a door frame. A peripheral edge 38 is provided for sealing together with a front wall (not shown). A pleated section 37 is disposed between central mounting section 36 and peripheral edge 38, and preferably comprises generally-circumferential pleats that straighten out (i.e., unfold) during inflation. The prior art as shown in FIG. 4 has employed a substantially constant height of the pleats around the circumference in order to obtain an expansion trajectory perpendicular to the unexpanded orientation of the bolster.

Figure 5:
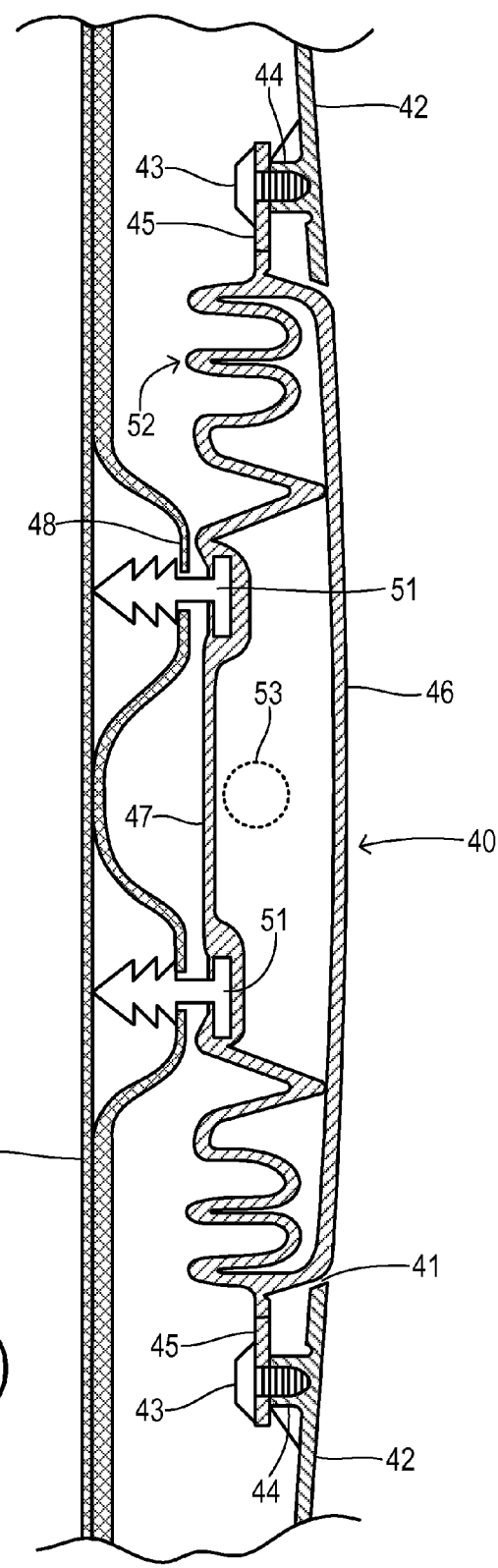
FIG. 5 is a cross section of another prior art bolster with circumferential pleats.

The present invention may also be adapted for use in a bladder mounting arrangement as shown in FIG. 5, wherein a bolster 40 can be mounted within an aperture 41 in a trim panel 42. Fasteners 43 connect with bosses 44 in the back of panel 42 to hold tabs 45 that extend from the sides of a bladder 46. A central mounting section 47 of bladder 46 is mounted to remain stationary on rigid mounting brackets 48 on a vehicle frame structure 50 using fasteners 51. Bladder 46 has a pleated section 52 with substantially identical pleats on opposite sides of central section 47 so that expansion proceeds perpendicularly outward from panel 42. By holding bolster 40 against frame structure 50, a reaction surface is provided against which an outward inflation can be accomplished when inflation gas is released from a gas canister 53 as known in the art.

Figure 6A:
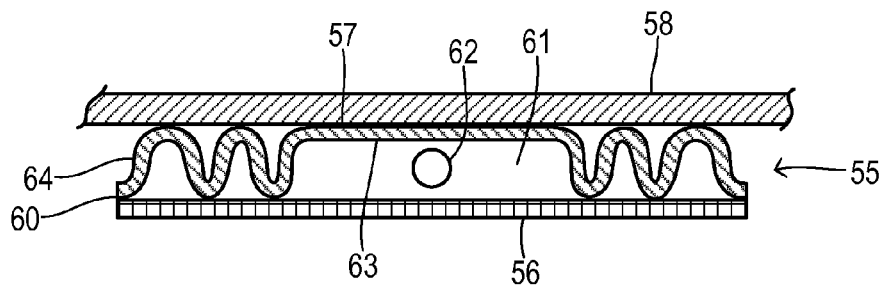
FIGS. 6A and 6B are cross sections of a prior art bolster with circumferential pleats before and during inflation, respectively.
Figure 6B:
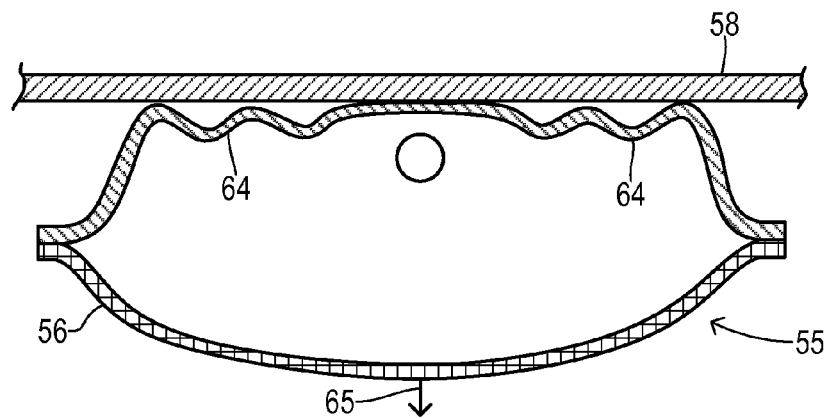

The general symmetric inflation of the prior art is shown in FIGS. 6A and 6B. An uninflated bolster 55 in FIG. 6A includes a front wall 56 and a back wall 57 which is mounted to a rigid structure 58 such as a dashboard frame, glove box frame, or a door frame. Walls 56 and 57 are sealed around a periphery 60 (e.g., by vibration welding or hot plate welding) to create an inflatable chamber 61 to receive an expansion gas from a gas cylinder 62. Back wall 57 has a central mounting section 63 that remains stationary against frame 58 as a reaction surface. A plurality of pleats 64 are formed in back wall 57 around its circumferential periphery. Pleats 64 have been formed with a generally constant size and shape around the periphery so that upon expansion (FIG. 6B), front wall 56 expands symmetrically away from frame 58 with respect to a center line 65. Pleats 64 at each radial position around the circumference of bladder 55 unfold to a substantially identical length, thereby resulting in even expansion and a trajectory perpendicularly outward along center line 65.

Figure 7:
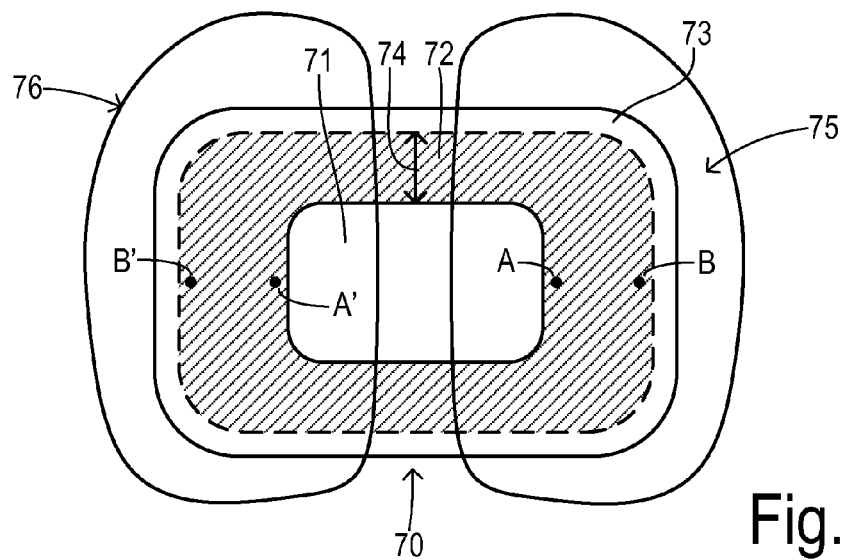
FIG. 7 is a front view of a bolster indicating a pleated section and showing quadrants on opposite sides that are to expand asymmetrically (e.g., with a greater expansion or bias to one side).

An even projection may not always be desired. In particular, one end or the other of the bladder may be required to expand by a greater amount in order to bias expansion into a trajectory not perpendicular with the Class A surface. The present invention achieves an uneven expansion by configuring circumferential pleats in an asymmetrical manner. As shown in FIG. 7, a back wall 70 may have a central mounting section 71 and a pleated section 72 radially outward from central mounting section 71 and extending around the full circumference. A peripheral edge 73 lies outside pleated section 72. Pleated section 72 may generally have a radial width 74 (measured in a plane parallel with the Class A surface). By taking into consideration all the unfolded lengths of the pleats themselves (referred to herein as the transverse curve length), the present invention generates uneven expansion. More specifically, the outward expansion at each different radius around the periphery is determined by imparting an appropriate transverse curve length through the pleats that varies around the circumference corresponding to the desired uneven expansion. A first quadrant 75 corresponds to an end of the bolster where the initial (i.e., uninflated) Class A surface is more distant from the passenger than the Class A surface in a second quadrant 76 which is closer to the passenger. Thus, distant quadrant 75 requires an additional length of expansion relative to close quadrant 76. As used herein, a quadrant may comprise a circumferential slice of pleated section 72 between radii separated by an angle in the range of about 90° to about 180°.

Expansion of the pleats in distant quadrant 75 occurs between points A and B at the inner and outer edges of pleated section 72, respectively. Expansion of the pleats in close quadrant 75 occurs between points A' and B' at the inner and outer edges of pleated section 72, respectively. Therefore, a transverse curve length is between points A and B along a radius within distant quadrant 75 is made greater than a transverse curve length between points A' and B' along a second radius in close quadrant 76. Since the maximum expansion within an area is limited by the smallest transverse curve length in that area, a smallest transverse curve length in distant quadrant 75 is greater than a largest transverse curve length in close quadrant 76. As a result, expansion is biased toward distant quadrant 75 because more unfolding length is available in the corresponding pleats.

Figure 8A:
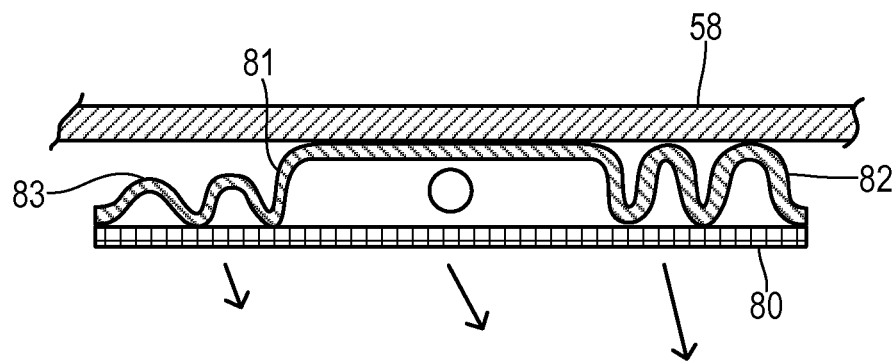
FIGS. 8A and 8B are cross sections of a bolster of the present invention with circumferential pleats before and during inflation, respectively.
Figure 8B:
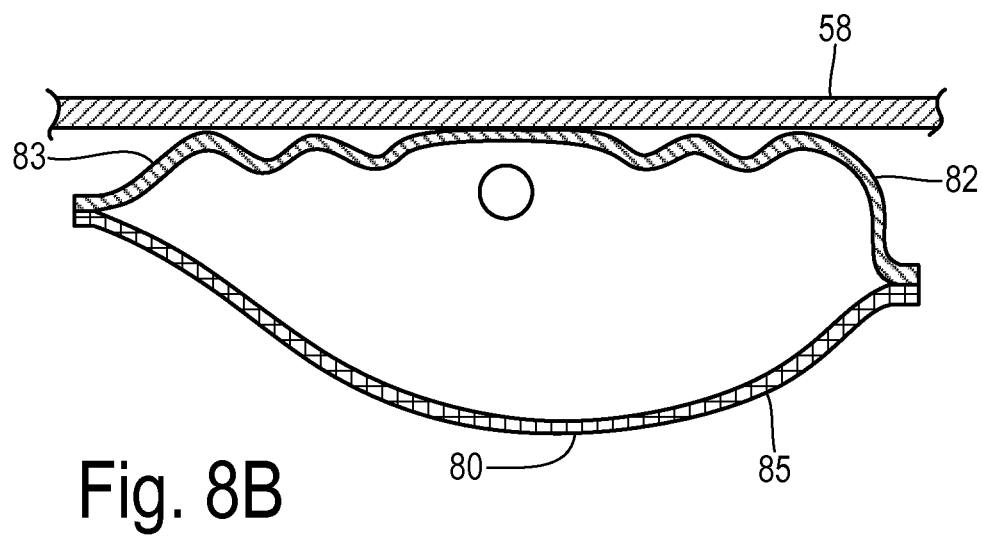

One embodiment of different pleat sizes are shown in FIG. 8A. A front wall 80 is sealed with a back wall 81, wherein pleats 82 on one side of back wall 81 contain a larger height and longer overall transverse curve length than pleats 83 at the opposite end of back wall 81. Because of the greater transverse curve length at pleats 82 than the transverse curve length along pleats 83, expansion of front wall 80 is biased at region 85 toward the end of the bladder corresponding to pleats 82.

Figure 9:
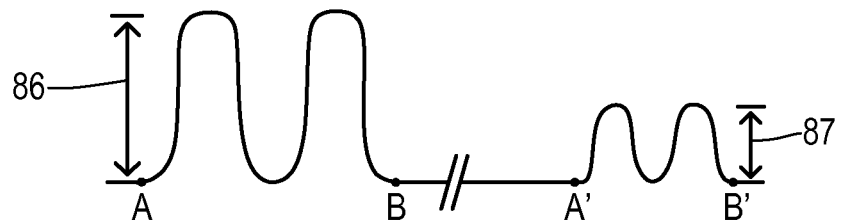
FIG. 9 shows a first embodiment of variable transverse curve lengths provided by the pleats.

A variable transverse curve length between points A and B can be obtained by employing pleats with a variable height as shown in FIG. 9. Thus, the pleats may have a first height 86 in a portion of the back wall corresponding to the distant quadrant while having a shorter height 87 in the portion of the back wall corresponding to the close quadrant.

Figure 10:
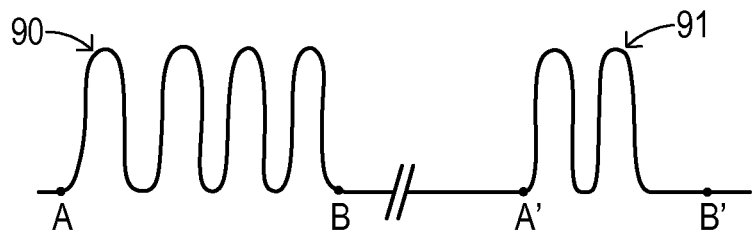
FIG. 10 shows a second embodiment of variable transverse curve lengths provided by the pleats.

Instead of the same number of continuous circumferential pleats with variable height, extra pleats may also be added to an area as shown in FIG. 10. Thus, a first group of pleats 90 corresponding to the distant quadrant has a greater number of folds than a second group of pleats 91 corresponding to the close quadrant.

Figure 11:
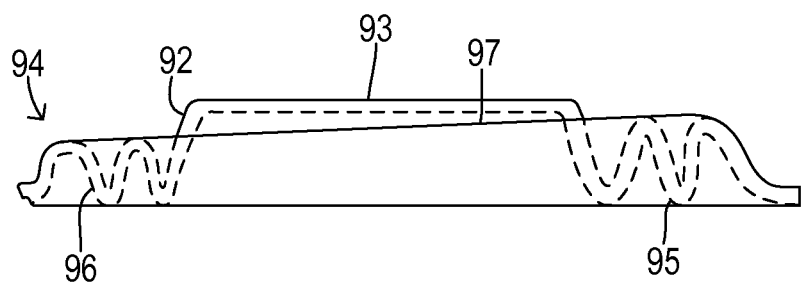
FIG. 11 is a side view of a back bladder wall with a sloping pleat height between opposite ends of the wall.

In a preferred embodiment, each of the pleats extends continuously around the pleated section as shown in a side view in FIG. 11. More specifically, a back wall 92 has a central mounting section 93 and a pleated section 94. The pleats include two and a half folds. One end of pleated section 94 has tall pleats 95 corresponding to the distant quadrant. The opposite end of pleated section 94 has short pleats 96 corresponding to the close quadrant. Short pleats 96 are displaced toward the front wall (not shown) to reduce the oil-canning effect at the front wall. Along the two is intermediate sides between the tall and short pleats, the sloping pleat height 97 provides a transition between the different pleat heights.

What is claimed is:

1. An active bolster for protecting a person in a passenger seating area in an automotive vehicle during a crash event, comprising:
    an expandable back wall for mounting against a rigid structure of the vehicle;
    an expandable front wall overlying the back wall and forming an interior trim component of the vehicle, wherein the front wall has a generally planar first surface facing the passenger seating area and a second surface facing the back wall, wherein the front wall and back wall have outer peripheral edges sealed together to provide a bladder chamber therebetween, and wherein the unexpanded first surface is skewed with respect to the passenger seating area defining a close quadrant and a distant quadrant on opposite ends of the first surface; and
    a gas source for supplying an expansion gas to inflate the bladder chamber during the crash event;
    wherein the back wall has a substantially stationary central mounting section for attaching to the rigid structure and a pleated section between the central mounting section and the peripheral edge, wherein the pleated section comprises a plurality of generally-circumferential pleats that unfold during inflation, wherein the pleats provide a transverse curve length that is radially variable, wherein a smallest transverse curve length in the distant quadrant is greater than a largest transverse curve length in the close quadrant so that the expansion of the bladder chamber is biased toward the distant quadrant.

2. The bolster of claim 1 wherein each of the pleats extends continuously around the pleated section, and wherein at least one pleat has a variable pleat height which is greatest at the distant quadrant.

3. The bolster of claim 1 wherein each of the pleats extends continuously around the pleated section, and wherein at least one pleat has a variable pleat height which is greatest at the distant quadrant, is smallest at the close quadrant, and is sloped between the close quadrant and the distant quadrant.

4. The bolster of claim 1 wherein the pleated section includes a number of pleats at the distant quadrant that is greater than a number of pleats at the close quadrant.

5. The bolster of claim 1 wherein the back wall and front wall are comprised of molded plastic material.

6. The bolster of claim 5 wherein the sealed peripheral edges are welded.

7. The bolster of claim 1 wherein the bolster is an active knee bolster, and wherein the rigid structure is a glove box door.

\* \* \* \* \*